US012568982B2

(12) United States Patent
Han

(10) Patent No.: US 12,568,982 B2
(45) Date of Patent: Mar. 10, 2026

(54) SYSTEMS FOR RETAINING POTENCY IN AN INFUSED BEVERAGE

(71) Applicant: Vertosa Inc., Pleasanton, CA (US)

(72) Inventor: Chunxiao Han, Pleasanton, CA (US)

(73) Assignee: Vertosa Inc., Berkeley, CA (US)

( * ) Notice: Subject to any disclaimer, the term of this patent is extended or adjusted under 35 U.S.C. 154(b) by 45 days.

(21) Appl. No.: 17/483,443

(22) Filed: Sep. 23, 2021

(65) Prior Publication Data

US 2022/0087289 A1 Mar. 24, 2022

Related U.S. Application Data

(60) Provisional application No. 63/082,148, filed on Sep. 23, 2020.

(51) Int. Cl.
| | |
|---|---|
| *A23B 70/10* | (2025.01) |
| *A23L 2/38* | (2021.01) |
| *A23L 2/68* | (2006.01) |
| *A23L 29/00* | (2016.01) |
| *A23L 29/10* | (2016.01) |

(52) U.S. Cl.
CPC ................ *A23B 70/10* (2025.01); *A23L 2/38* (2013.01); *A23L 2/68* (2013.01); *A23L 29/04* (2016.08); *A23L 29/045* (2016.08); *A23L 29/10* (2016.08)

(58) Field of Classification Search
None
See application file for complete search history.

(56) References Cited

U.S. PATENT DOCUMENTS

| | | | |
|---|---|---|---|
| 5,424,082 A * | 6/1995 | Dake | A23L 2/68 |
| | | | 426/74 |
| 2019/0142034 A1 | 5/2019 | Forsythe | |
| 2020/0138772 A1 | 5/2020 | Berl et al. | |
| 2020/0179044 A1 | 6/2020 | Jackowetz et al. | |

FOREIGN PATENT DOCUMENTS

WO 2020018512 A1 1/2020

OTHER PUBLICATIONS

Aserin: Multiple Emulsion: Technology and Applications; John Wiley & Sons, Dec. 10, 2007—Science—352 pages (Year: 2007).*
Piorkowski: Beverage emulsions: Recent developments in formulation, production, and applications; Food Hydrocolloids 42 (2014) 5e41; Received May 13, 2013, Accepted Jul. 9, 2013, Available online Jul. 26, 2013 (Year: 2013).*
'855: DE 202011107855 U1; Published on Feb. 18, 2013. (Year: 2013).*

* cited by examiner

*Primary Examiner* — Patricia A George
(74) *Attorney, Agent, or Firm* — Hunt IP Law

(57) ABSTRACT

The invention relates to beverages including an active emulsion and a blank emulsion, wherein the blank emulsion is used as a sacrificial agent to retain the active emulsion's potency within an infused beverage.

16 Claims, 1 Drawing Sheet

SYSTEMS FOR RETAINING POTENCY IN AN INFUSED BEVERAGE

CLAIM OF PRIORITY UNDER 35 U.S.C. § 119

The present Application for Patent is a bypass continuation of International Application No. PCT/US21/51787, entitled "SYSTEMS FOR RETAINING POTENCY IN AN INFUSED BEVERAGE," filed on Sep. 23, 2021, which in turn claims priority to Provisional Application No. 63/082, 148 entitled "BLANK EMULSION AS SACRIFICIAL AGENT TO RETAIN ACTIVE INPUT'S POTENCY WITHIN AN INFUSED PRODUCT" filed Sep. 23, 2020, which is hereby expressly incorporated by reference herein.

BACKGROUND

Field

The invention relates to infused beverages.

Background

The following description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

For beverages that are infused with extracts or derivatives of Cannabis, referred to herein as a cannabis-infused beverage, consistent and stable potency can be considered a key to building trust with end consumers so that consumption results in a consistent and expected experience. This is comparable to the beer or wine industry, in which consumers know how they will feel after consuming, for example, a beer or a glass of red wine. Thus, a key to building this trust can be to retain the potency of the infused beverages.

When producing a cannabis-infused beverage using emulsion technologies, potency loss can come from two root causes: physical loss and chemical loss. Physical loss is defined by emulsion droplets sticking to the packaging material, causing the potency in the beverage to decrease. Chemical loss is defined by reactions such as oxidation within the beverage that cause cannabinoids to convert chemically into other cannabinoids or intermediate products, thus reducing potency. To ensure consistent and stable potency, both factors need to be considered.

Aluminum cans and plastic bottles are commonly used for packaging beverages. Besides packaging regulations, there are numerous reasons why a beverage company might prefer aluminum cans and plastic bottles over glass bottles. For instance, an aluminum can is recyclable, has a shape and weight that makes storage and transportation more economical and has a manufacturing process that fits in with existing production chains. Further, many markets prefer the aesthetic of cans.

Unfortunately, the use of aluminum cans comes with obstacles when the beverage includes active oil/water emulsions (emulsions with an active agent). Like glass, aluminum is hydrophilic. Storing liquid directly in hydrophilic aluminum can lead to any number of issues, including corrosion, flavor interference, and instability. To solve this problem, an internal liner of thin hydrophobic polymer can be sprayed onto the inner wall of the aluminum can. The liner material can usually be made with major components such as, but not limited to, polyethylene (PE), polypropylene (PP), Bisphenol A (BPA), or other types of polymers such as polyacrylic or epoxy.

This internal liner can be a good solution for most beverages. However, for cannabinoid oil/water emulsions, the hydrophobic oil at the center of the emulsion droplet is attracted to and can attach to the hydrophobic liner. This can happen faster when there is carbonation in the beverage. The effect of the oil attaching to the liner can reduce the potency shelf life of infused beverages, leading to widespread ineffectiveness and inconsistencies.

Similar potency loss issues can happen to other hydrophobic containers such as, for example, polyethylene terephthalate (PET), polypropylene (PP), polyethylene (PE), high-density polyethylene (HDPE), low-density polyethylene (LDPE), and the like. It is very challenging to predict the compatibility of hydrophobic packaging towards cannabis emulsions. In addition, it is very challenging to change the chemical composition of the existing packaging material. Therefore, if certain packaging is not compatible with a particular cannabis emulsion, the chemistry of the emulsion must be modified.

Various chemical reactions can happen to the active agents within the emulsion droplets, such as but not limited to: oxidation, reduction, ultraviolet (UV)-initiated reactions, and the like. For cannabinoids, oxidation is likely to be the most significant factor to reduce potency. Due to differences in chemical structural features, oxidation effects can vary among different cannabinoids. For example, Delta-9 THC is considered to oxidize readily, with the final oxidation product as CBN and many intermediate oxidized products along the pathway. Delta-8 THC is also known to oxidize, with CBN as the final oxidized product but with a slower oxidation rate than Delta-9 THC. CBD is considered to have a low oxidation rate. CBN is a final oxidized product so it would not lose potency due to oxidation in a cannabis beverage.

The effect of oxidation on cannabinoids can change when cannabinoids are turned into emulsions due, for example, to changes in surface area. Also, dissolved oxygen in a beverage would be expected to have a higher solubility in an emulsion compared to a water phase. Thus, the effect of oxidation on cannabinoids in emulsions also needs to be considered.

Oxidation can be a major issue for a cannabis beverage if the oxygen is not reduced or controlled during the beverage production process. Certain packaging types can also ingress oxygen over time. When those two factors combine under a relatively higher temperature, the reduction of cannabinoid potency can be dramatic.

Thus, there remains a need in the art for new methods and emulsion compositions, especially cannabinoid emulsions, that deliver cannabinoid homogeneity throughout the beverage as well as maintain a controlled interaction with hydrophobic packaging material while delaying oxidation reactions. By achieving both, the potency of the infused beverage can be stable.

SUMMARY

Some embodiments of the invention relate to a system to preserve potency in a beverage including a hydrophobic active ingredient. In some embodiments, the beverage can further include a first emulsion composition and a second emulsion composition. In some embodiments, the second emulsion composition can include the hydrophobic active ingredient, a second carrier oil, a second surfactant, and water. In some embodiments, the first emulsion composition can include a first carrier oil, a first surfactant, and water and does not include the hydrophobic active ingredient of the first emulsion composition. In some embodiments, the average droplet size in the emulsion can be less than 200 nm. In some embodiments, the first and second emulsion compositions can remain in dispersed form and the droplet size can remain unaffected upon dilution in an aqueous solution to thereby form a final product. In some embodiments, the final product can be the beverage capable of being stored at room temperature in a hydrophobic packaging for at least 6 months without change in potency or droplet size.

In some embodiments, the first emulsion composition can be at least 10% higher in volume of the second emulsion amount.

In some embodiments, the first emulsion composition can include a *Quillaja* extract composition.

In some embodiments, the first emulsion can include one or more preservatives, one or more pH modulators, or both.

In some embodiments, the first carrier oil and the second carrier oil can be the same.

In some embodiments, the first carrier oil can be sunflower oil, olive oil, coconut oil, MCT (medium chain triglyceride) oil, LCT (long chain triglyceride) oil, sesame oil, avocado oil, palm oil, soybean oil, corn oil, peanut oil, canola oil, grape seed oil, corn oil, hazelnut oil, rice bran oil, linseed oil, safflower oil, sesame oil, passion fruit oil or combinations thereof.

In some embodiments, the first surfactant and the second surfactant can be the same.

In some embodiments, the final product can include ascorbic acid or EDTA as an antioxidant to delay potency loss due to oxidation.

In some embodiments, the ascorbic acid can be at least 50 ppm of the final product and the EDTA can be at least 10 ppm of the final product.

In some embodiments, the ascorbic acid or ETDA can be applied together with an oil-soluble antioxidant.

In some embodiments, the oil-soluble antioxidant can be propyl gallate, rosemary extract or Vitamin E.

In some embodiments, the system can be capable of reducing the second emulsion from attaching to the packaging and reducing chemical potency decay caused by oxidation.

Some embodiments of the invention relate to a method to preserve potency in a beverage using the system described herein. In some embodiments, the method can include combining the first emulsion and the second emulsion in the packaging.

In some embodiments, the hydrophobic compound can be Tetrahydrocannabinolic acid A (THCA-A), Tetrahydrocannabinolic acid B (THCAB), Tetrahydrocannabinol (THC), Tetrahydrocannabinolic acid C (THCA-C), Tetrahydrocannabinol C (THC-C), Tetrahydrocannabivarinic acid (THCVA), Tetrahydrocannabivarin (THCV), Tetrahydrocannabiorcolic acid (THCA-C), Tetrahydrocannabiorcol (THC-C), Delta-7-cis-iso-tetrahydrocannabivarin, Delta-8-tetrahydrocannabinolic acid ($\Delta^8$-THCA), Delta-9-tetrahydrocannabinol ($\Delta^9$-THC), Cannabidiolic Acid (CBDA), Cannabidiol (CBD), Cannabidiol monomethylether (CBDM), Cannabidiol-C(CBD-C), Cannabidivarinic Acid (CBDVA), Cannabidivarin (CBDV), Cannabidiorcol (CBD- C), Cannabigerolic acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CBCVA), Cannabichromevarin (CBCV), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabinolic acid (CBNA), Cannabinol (CBN), Cannabinol methylether (CBNM), Cannabinol-$C_4$ (CBN-$C_4$), Cannabivarin (CBV), Cannabinol-C(CBN-C), Cannabiorcol (CBN-$C_1$), Cannabinodiol (CBND), Cannabinodivarin (CBVD), Cannabitriol (CBT), 10-Ethoxy-9-hydroxy-delta-6a-tetrahydrocannabinol, 8,9-dihydroxy-delta-6a-tetrahydrocannabinol (8,9-Di-OH-CBT-C5), Cannabitriolvarin (CBTV), Ethoxy-cannabitriolvarin (CBTVE), Dehydrocannabifuran (DCBF), Cannabifuran (CBF), Cannabichromanon (CBCN), Cannabicitran (CBT), 10-oxo-delta-6a-tetrahydrocannabinol (OTHC), Delta-9-cis-tetrahydrocannabinol ($\Delta^9$-cis-THC), Cannabiripsol (CBR), -3,4,5,6-tetrahydro-7-hydroxy-alpha-alpha-2-trimethyl-9-n-propyl-2,6-methano-2H-1-benzoxocin-5-methanol (OH-iso-HHCV), Trihydroxy-delta-9-tetrahydrocannabinol (triOH-THC), Isocanabinoids, Epigallocatechin gallate, and/or combinations thereof.

In some embodiments, the hydrophobic compound can be myrcene, limonene, linalool, beta-caryophyllene, alpha-pinene and beta-pinene, alpha-bisabolol, eucalyptol, trans-nerolidol, humulene, delta-3-carene, camphene, borneol, terpineol, valencene, geraniol, eugenol, sabinene, phellandrene, borneol, isoborneol, phytol, menthol, geraniol, citronellol, ocimene, halomon, thymol, carvacrol, thujene, camphene, camphor, verbenone, botrydial, ngaione, cuparane, labdane, ferruginol, cafestol, and/or combinations thereof.

In some embodiments, the hydrophobic compound can be Vitamin E; Vitamin B12; Vitamin A; Vitamin D; Vitamin B; Omega 3; astaxanthin; fish oil; MCT oil; coconut oil; palm oil; eicosapentaenoic acid (EPA); docosahexaenoic acid (DHA); essential oils such as but not limited to lemon oil, orange oil, peppermint oil, Ylang-Ylang oil, lemongrass oil, tea tree oil, rosemary oil, Australian sandalwood oil, grapefruit oil, frankincense oil, cedarwood oil, patchouli oil, cinnamon bark oil, bergamot oil, chamomile oil, lemon-eucalyptus oil, ginger oil, key lime oil, vanilla oil, clove oil, and/or combinations thereof.

Various objects, features, aspects, and advantages of the inventive subject matter will become more apparent from the following detailed description of preferred embodiments, along with the accompanying figures in which like numerals represent like components.

DETAILED DESCRIPTION

Figure 1:
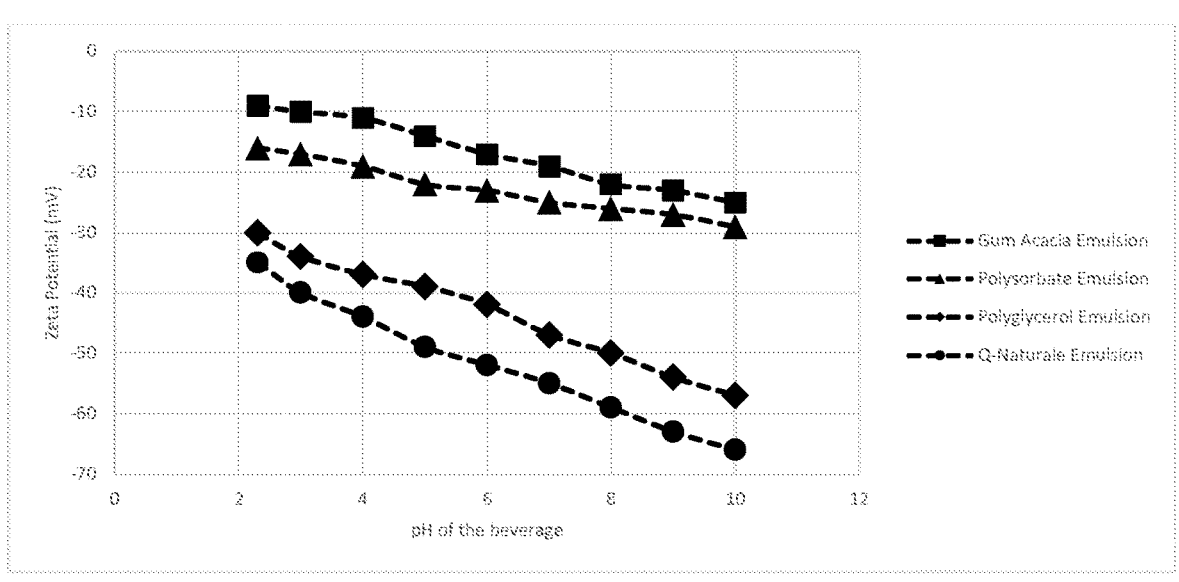
FIG. 1 shows results of experiments related to zeta potential and pH of different emulsion types.

As disclosed herein, methods and compositions for creating a storage-stable infused beverage by using advanced emulsion techniques are provided.

Some embodiments of the invention can relate to an oil/water emulsion, where the core of the emulsion droplet includes one or more active agents such as cannabinoids, carrier oils, and other hydrophobic ingredients. The emulsifier sits on the edge of the oil and water, and outside of the oil core is the continuous water phase. Thus, an emulsion composition can include droplets that can include active compounds. The emulsion can be ready to be diluted into a beverage at any given concentration while the droplets remain individually isolated and suspended.

To prevent the physical potency loss, the invention relates to the use of a "blank emulsion" as a sacrificial agent to retain an active agent's potency within an infused product. An infused product used with this invention can be, for example, a beverage that is infused with an emulsion that has an active agent or ingredient such as a flavor, nutrient, medicinal compound, cannabinoid, etc. The emulsion with the active agent can be referred to as the active emulsion. When infusing the active emulsion into a beverage or cosmetic product, there is potential for the active emulsion droplets to stick to the packaging material, such as an aluminum can liner or PET bottle. This effect is called the "scalping effect." The methods and compositions disclosed herein aim to reduce the scalping of an active agent by introducing a blank emulsion, which contains no active agent in the emulsion. The blank emulsion has a higher affinity to the packaging material, thus saturating the surface and preventing the active emulsion droplets from attaching to the packaging material. As such, the potency loss of the active ingredient can remain very low, thus ensuring a longer shelf life and consistent potency of the product.

To prevent the chemical potency loss, the invention can include either one or a plurality of specially tested antioxidants that work best with cannabinoids in the emulsion within a beverage. The one or more antioxidants can be utilized when extremely low dissolved oxygen cannot be achieved or maintained during production.

In some embodiments, the invention relates to a "complementary blank emulsion" which contains the same ingredients as the emulsion with the active ingredient ("active emulsion"). The blank emulsion and the active emulsion are then infused together into the finished packaging. The active emulsion as contemplated herein can be any emulsion having, for example, a flavor, medicine, or cannabis as an active ingredient. In some embodiments, the actual or active emulsion are those disclosed in patent Application Numbers: PCT/US2019/041965 and PCT/US2020/040107, each of which is incorporated by reference herein in its entirety, including drawings.

In another embodiment, the invention relates to a "universal blank emulsion." In contrast to the "complementary blank emulsion," the universal blank emulsion does not necessarily have the same ingredients as the active emulsion. The universal blank emulsion can be mixed with any active emulsion and mixed with any beverage. As used herein, a universal blank emulsion can be defined as a blank emulsion that can be used in a variety of beverage products.

The invention of the blank emulsion relates to the unexpected finding that pH does not significantly affect potency (see Examples 2 and 3) and thus can be used with a variety of beverages. Other characteristics of the universal blank emulsion can include but need not be limited to:

1. having desirable taste when mixed with a beverage;
2. having a high affinity to can liners compared to other emulsifiers;
3. being easily produced in large scale; and/or
4. having healthy, natural, and organic ingredients.

In some embodiments, the technology disclosed herein can stabilize potency and is independent of active emulsion types and material types. The blank emulsion can prevent the active emulsion from attaching to the can liner and thereby can provide a cannabis-infused beverage that has cannabinoid homogeneity due to hydrophobicity and charge (zeta potential), each of which is further described below.

Hydrophobicity is the physical property of a molecule that is seemingly repelled from a mass of water by the association of nonpolar groups or molecules in an aqueous environment, and arises from the tendency of water to exclude nonpolar molecules.

Zeta potential describes the surface charge of a material and can indicate whether two materials will attract or repel each other. Zeta potential of the emulsions described herein can be determined by the emulsifier's chemical functional group or groups, while zeta potential of a packaging material can be determined by materials structure. Zeta potential changes when pH changes as demonstrated in Example 3.

In some embodiments, the blank emulsion can include an extract of *Quillaja saponaria* (e.g., Q-Naturale™, produced by Ingredion). Advantages of *Quillaja* extracts include having a neutral flavor with no additional bitter or weedy smell or taste compared with other emulsifiers. Also, *Quillaja* extracts can sustain large amount of oil droplets with little amount of emulsifier applied, which simplifies manufacturing. *Quillaja* extracts can potentially come from organic sources, which makes the emulsion ingredients more desirable for many consumers and uses.

Methods of producing the emulsions are provided. The methods can include adding a main emulsifier to water; optionally adding one or more preservatives, pH modulators, and/or antioxidants; and adding a carrier oil. The resulting mixture can be processed to produce a coarse emulsion by, for example, sonication, homogenization, high-shear mixing, and/or the like. Afterward, the coarse emulsion can be processed through a microfluidic or high-pressure homogenizer device at a high pressure (e.g., 20, 22, 24, 26, 28, and/or 30k PSI) for 1-3 passes. Increases in the pressure and number of passes can create smaller emulsion droplets.

In some embodiments, an emulsion composition can include a cannabinoid oil, a carrier oil, a surfactant, and/or water. In some embodiments, the composition can include more than one surfactant, such as a main surfactant and a co-surfactant.

The average droplet size in the composition can be less than about 2000 nm, either at the raw emulsion level and/or at the diluted level, such as, for example, about 0.1 mg/g. In some embodiments, the average droplet size of the emulsion can be between about 10 and about 100 nm (e.g., 10, 20, 30, 40, 50, 60, 70, 80, 90, or 100 nm), about 100 and about 300 nm (e.g., 100, 120, 140, 160, 180, 200, 220, 240, 260, 280, or 300 nm), about 300 and about 500 nm (e.g., 300, 325, 350, 375, 400, 425, 450, 475, or 500 nm), or about 500 and about 1000 nm (e.g., 500, 550, 600, 650, 700, 750, 800, 850, 900, 950, or 1000 nm). In some embodiments, the size and stability of the droplet does not vary significantly with dilution or time, and the composition can be stored at room temperature for at least about 12 months, or preferably at least about 18 months, or more preferably at least about 24 months, or even more preferably at least about 30 months, or most preferably at least about 36 months without a significant change in droplet size. The emulsions and beverages disclosed herein are storage stable.

The cannabinoid can be a naturally occurring phytocannabinoid and/or a synthetic cannabinoid. The cannabinoid can be, for example, tetrahydrocannabinol (THC), cannabidiol (CBD), any other single cannabinoid, and/or combinations of cannabinoids. The purity of the cannabinoid can be relatively low (full plant distillate) up to very high purity (distillate or isolate). The cannabinoids can be, for example, any of Tetrahydrocannabinolic acid A (THCA-A), Tetrahydrocannabinolic acid B (THCAB), Tetrahydrocannabinol (THC), Tetrahydrocannabinolic acid C (THCA-C), Tetrahydrocannabinol C (THC-C), Tetrahydrocannabivarinic acid (THCVA), Tetrahydrocannabivarin (THCV), Tetrahydrocannabiorcolic acid (THCA-C), Tetrahydrocannabiorcol (THC-C), Delta-7-cis-iso-tetrahydrocannabivarin, Delta-8-tetrahydrocannabinolic acid ($\Delta^8$-THCA), Delta-9-tetrahydrocannabinol ($\Delta^9$-THC), Cannabidiolic Acid (CBDA), Cannabidiol (CBD), Cannabidiol monomethylether (CBDM), Cannabidiol-C (CBD-C), Cannabidivarinic Acid (CBDVA), Cannabidivarin (CBDV), Cannabidiorcol (CBD-C), Cannabigerolic acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CBCVA), Cannabichromevarin (CBCV), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabinolic acid (CBNA), Cannabinol (CBN), Cannabinol methylether (CBNM), Cannabinol-$C_4$ (CBN-$C_4$), Cannabivarin (CBV), Cannabinol-C (CBN-C), Cannabiorcol (CBN-$C_1$), Cannabinodiol (CBND), Cannabinodivarin (CBVD), Cannabitriol (CBT), 10-Ethoxy-9-hydroxy-delta-6a-tetrahydrocannabinol, 8,9-dihydroxy-delta-6a-tetrahydrocannabinol (8,9-Di-OH-CBT-C5), Cannabitriolvarin (CBTV), Ethoxy-cannabitriolvarin (CBTVE), Dehydrocannabifuran (DCBF), Cannabifuran (CBF), Cannabichromanon (CBCN), Cannabicitran (CBT), 10-oxo-delta-6a-tetrahydrocannabinol (OTHC), Delta-9-cis-tetrahydrocannabinol ($\Delta^9$-cis-THC), Cannabiripsol (CB R), -3,4,5,6-tetrahydro-7-hydroxy-alpha-alpha-2-trimethyl-9-n-propyl-2,6-methano-2H-1-benzoxocin-5-methanol (OH-iso-HHCV), Trihydroxy-delta-9-tetrahydrocannabinol (triOH-THC), Isocanabinoids, Epigallocatechin gallate, and combinations thereof.

In some embodiments, the composition can include about 1%, 5%, 10%, 15%, 20%, 25%, 30%, 35%, 40%, 45%, 50%, 55%, 60%, 65%, 70%, 75%, 80%, 85%, 90% or more total cannabinoid, whether this amount represents a single cannabinoid or a combination of multiple cannabinoids.

The surfactant can include one surfactant or a mixture of surfactants. For example, the surfactant can be a high molecular weight main surfactant and a co-surfactant of lower molecular weight. The main surfactant is preferred to be a polyglyceryl surfactant, although other surfactants such as a polysorbate surfactant (e.g., tween), a long chain PEG surfactant, and/or a surfactant derived from nature such as *Quillaja* saponin or gum acacia are also contemplated herein. In some embodiments, the surfactant is a *Quillaja* extract such as Q-Naturale™. The main surfactant can be at least about 0.1, 0.2, 0.3, 0.4, 0.5, or more times the total amount of cannabinoids and carrier oil. For example, the main surfactant can be at least about 0.3 times the total amount of cannabinoids and carrier oil (e.g., 0.3, 0.31, 0.32, 0.33, 0.34, 0.35, 0.36, 0.37, 0.38, 0.39, or 0.40 times the total amount of cannabinoids and carrier oil). When co-surfactant is present, its amount can be at least about 0.15 times the amount of main surfactant (e.g., 0.15, 0.16, 0.17, 0.18, 0.19, 0.20, 0.21, 0.22, 0.23, 0.24, or 0.25 times the amount of main surfactant).

In some embodiments, the surfactant can be in a range of about 0% to about 10% of the composition (e.g., 0%, 1%, 2%, 3%, 4%, 5%, 6%, 7%, 8%, 9%, or 10%). In some embodiments, the range can be about 0.01% to about 5% (e.g., 0.01%, 1%, 1.5%, 2%, 2.5%, 3%, 3.5%, 4%, 4.5%, or 5%).

In some embodiments, the long chain PEG surfactant can be a non-ionic surfactant sold under the trademark BRIJ®. Examples include but are not limited to BRIJ® CS20 (Ceteareth-20, polyoxyethylene (20) cetyl stearyl ether), BRIJ® C10 (Ceteth-10, Polyoxyethylene (10) cetyl ether), BRIJ® C20 (Ceteth-20, Polyoxyethylene (20) cetyl ether), BRIJ® IC20 (Isoceteth-20, Alkoxylated ether), BRIJ® IC20-70 (Isocetech-20 (Alkoxylated ether) and Aqua), BRIJ® L4 (Laureth-4, Ethoxylated Fatty Alcohol), BRIJ® L23 (Laureth-23, Polyoxyethylene (23) lauryl ether), BRIJ® L23-69 (Laureth-23 (Polyoxyethylene (23) lauryl ether) and Aqua), BRIJ® O10 (Oleth-10, Polyoxyethylene (10) oleyl ether), BRIJ® O20 (Oleth-20, Polyoxyethylene (20) oleyl ether), BRIJ® S10 (Steareth-10, Polyoxyethylene (10) stearyl ether), BRIJ® S20 (Steareth-20, Polyoxyethylene (20) stearyl ether), BRIJ® S100 (Steareth-100, Polyoxyethylene (100) stearyl ether), BRIJ® S721 (Steareth-21, ethoxylated fatty alcohols).

The PEG-derived surfactant can also be a derivative of Vitamin E TPGS, including but not limited to Vitamin E TPGS 200, Vitamin E TPGS 300, Vitamin E TPGS 400, Vitamin E TPGS 1000, Vitamin E TPGS 1500, Vitamin E TPGS 2000 and Vitamin E TPGS 4000, and the like, wherein the number listed refers to the polyethylene glycol chain molecular weight in each listed form of Vitamin E TPGS.

The natural surfactant can be derived from *Quillaja* saponin, such as Q-Naturale 100, 200, 200V, and/or 300. The natural surfactant can also be derived from acacia, such as Gum Arabic (also known as, gum sudani, acacia gum, Arabic gum, gum acacia, acacia, Senegal gum, and Indian gum).

In some embodiments, the polyglyceryl surfactant can be selected from polyglyceryl monoesters or polyglyceryl multi-esters. Non-limiting examples of polyglyceryl monoesters contemplated herein include polyglyceryl-4-caprate, polyglyceryl-4-caprylate, polyglyceryl-4-laurate, polyglyceryl-4-isostearate, polyglyceryl-4-oleate, polyglyceryl-5-laurate, polyglyceryl-5-myristate, polyglyceryl-5-isostearate, polyglyceryl-5-oleate, polyglyceryl-5-stearate, polyglyceryl-6-isostearate, polyglyceryl-6-oleate, polyglyceryl-6-stearate, polyglyceryl-8-oleate polyglyceryl-8-stearate, polyglyceryl-10-laurate, polyglyceryl-10-myristate, polyglyceryl-10-palmitate, polyglyceryl-10-isostearate, polyglyceryl-10-linoleate, polyglyceryl-10-oleate, polyglyceryl-10-stearate, polyglyceryl-10-behenate/eicosadioate, polyglyceryl-10-hydroxystearate/stearate/eicosadioate, and/or polyglyceryl-10-fatty ester (POLYALDO® 10-2-P). Non-limiting examples of polyglyceryl multi-esters contemplated in the composition disclosed herein include polyglyceryl-5-triisostearate, polyglyceryl-5-dioleate, polyglyceryl-5-trioleate, polyglyceryl-6-tricaprylate, polyglyceryl-6-dioleate, polyglyceryl-6-distearate, polyglyceryl-6-pentastearate, polyglyceryl-6-octastearate, polyglyceryl-8-decaerucate/decaisostearate/decaricinoleate, polyglyceryl-10-caprylate/caprate, polyglyceryl-10-dipalmitate, polyglyceryl-10-diisostearate, polyglyceryl-10-pentaisostearate, polyglyceryl-10-nonaisostearate, polyglyceryl-10-decaisostearate, polyglyceryl-10-dioleate, polyglyceryl-10-pentaoleate, polyglyceryl-10-decaoleate, polyglyceryl-10-distearate, polyglyceryl-10-tristearate, polyglyceryl-10-pentastearate, polyglyceryl-10-pentahydroxystearate, and/or polyglyceryl-10-heptahydroxystearate.

The co-surfactant, if present, can be, for example, a small molecule food surfactant, a natural lecithin, a purified lecithin, and/or combinations thereof. The natural lecithin, if present, can be extracted from, for example, soybean, egg, milk, marine source, rapeseed, cottonseed, sunflower seed, and/or the like. In some embodiments, the system does not need a co-surfactant. In embodiments that include a co-surfactant, the co-surfactant can be present at least about 0.15 times the amount of main surfactant (e.g., 0.15, 0.16, 0.17, 0.18, 0.19, 0.20, 0.21, 0.22, 0.23, 0.24, or 0.25 times, or more, the amount of main surfactant).

Phospholipids can also be present in the composition, for example, lecithins such as those extracted from soybean, egg, milk, marine sources, rapeseed, cottonseed, and/or sunflower seed. Preferably, lecithin can be used as co-surfactant, where its amount can be at least 0.15 times the amount of main surfactant. In some embodiments, lecithin can be used as the co-surfactant, wherein its amount can be at least about 0.15, 0.2, 0.3, 0.4, 0.5, or more times the amount of the main surfactant.

The composition can further include a preservative, an essential oil (e.g., lemongrass oil, tea tree oil, rosemary oil, Australian sandalwood oil, grapefruit oil, and/or the like), a terpene (e.g., myrcene, linalool, caryophyllene, limonene, alpha-pinene, ocimene, and/or the like), a flavoring agent (e.g., an essential oil, a bitter blocker, and/or a terpene) a food color (e.g., blue, green, red, purple, orange, and/or the like), a bitter blocker (e.g., ((3-[1-[(3,5-dimethylisoxazol-4-yl)methyl]pyrazol-4-yl]-1-[(3-hydroxyphenyl)methyl]imidazolidine-2,4-dione), GG-605-390-4, NP-844-232-9, QJ-6 15-696-6, TruClear™, stevia, and/or the like), an artificial flavor agent (e.g., mint, orange, strawberry, cherry, and/or the like). Such ingredients can improve the taste and appearance of the composition.

The preservative can include but is not limited to ethyl lauroyl arginate, sodium bi-sulphite, potassium benzoate, potassium sorbate, ascorbic acid, citric acid, benzoic acid, sodium benzoate, calcium ascorbate, erythorbic acid, sodium ascorbate, sorbic acid, sulphurous acid, calcium sorbate, Vitamin C, Vitamin E, and combinations thereof.

The composition can further include an antioxidant. In some embodiments, the antioxidant can be a vitamin. Vitamins can include, but are not limited to, Vitamin A (retinol), Vitamin C (ascorbic acid), and Vitamin E (tocopherol). In some embodiments, the antioxidant can be a carotenoid terpenoid such as, but not limited to, alpha or beta carotene, astaxanthin, cryptoxanthin, lutein, lycopene, zeaxanthin, or canthaxanthin; phenolic acids and their esters, such as, but not limited to, chicoric acid, chlorogenic acid, cinnamic acid, ellagic acid, ellagitannins, gallic acid, salicylic acid, rosmarinic acid, and gallotannins; nonflavonoid phenolics such as, but not limited to, curcumin, flavonolignans, xanthones, or eugenol; and/or flavonoids such as, but not limited to flavones, flavonols, flavanones, stilbenoids, isoflavone phytoestrogens, and anthocyanins. Other non-limiting examples of antioxidants can include capsaicin, bilirubin, citric acid, oxalic acid and phytic acid, EDTA, TBHQ, BHA, BHT, propyl gallate, and/or the like. In some embodiments, the antioxidant can be any commercially available antioxidant such as, for example, brewshield, structuan, rosemary extract, and/or the like (e.g., Herbalox® (41.19.32) provided by Kalsec).

The antioxidant can be, for example, an oil-soluble antioxidant or a water-soluble antioxidant as both types were tested in this invention. The oil-soluble antioxidants can stay within the emulsion droplet core, together with the active cannabinoids and carrier oil. The oil-soluble antioxidant can be between about 0.01-10% of the total oil phase (active+ carrier oil). For example, the oil-soluble antioxidant can be 0.01%, 0.03%, 0.06, 0.1%, 0.3%, 0.6%, 1%, 2%, 3%, 4%, 5%, 6%, 7%, 8%, 9%, or 10% of the total oil phase. The water-soluble antioxidant can be added into the beverage tank during manufacturing, and the ratio can be between about 0.01-2% of the total mass of the beverage (e.g., 0.01%, 0.025%, 0.05%, 0.075%, 0.1%, 0.25%, 0.5%, 0.75%, 1.0%, 1.25%, 1.50%, 1.75%, or 2%). There are also two important factors that determine how much water-soluble antioxidant can be used:

1) final allowable limit in beverage, for example, Ethylenediaminetetraacetic acid (EDTA) has upper allowable limit as 33 ppm in beverage.

2) flavor impact: citric acid or ascorbic acid can adjust pH and thus change the flavor of the beverage. So, the final concentration should be determined by flavor impact.

The carrier oil can be from plants such as, but not limited to, sunflower oil, olive oil, coconut oil, MCT (medium chain triglyceride) oil, LCT (long chain triglyceride) oil, sesame oil, avocado oil, palm oil, soybean oil, corn oil, peanut oil, canola oil, grapeseed oil, corn oil, hazelnut oil, rice bran oil, linseed oil, safflower oil, sesame oil, passion fruit oil, and/or combinations thereof. In some embodiments, the carrier oil can be at least 0.3 times the amount of the cannabinoids input material (distillate oil or isolate powder). For example, the carrier oil can be 0.3, 0.4, 0.5, 0.6, 0.7, 0.8, or 0.9 or more times the amount of the cannabinoids input material.

Table 1 provides a non-limiting example of a composition that includes a *Quillaja* extract.

TABLE 1

| Ingredients | Carrier oil | Q-Naturale | Water | Carrier oil potency | Preservatives |
|---|---|---|---|---|---|
| Weight | 1-5 g | 0.7-3.5 g | 0.3-91.5 g | 50-500 mg/g | 0.1% of total weight |

A beverage with an active ingredient can be prepared by adding the active emulsion and the blank emulsion to a beverage.

In some embodiments, the active ingredient can be any hydrophobic compound that would benefit from dispersing in an aqueous solution, including but not limited to terpenes, other essential oils, extract from herbs, eicosapentaenoic acid (EPA), docosahexaenoic acid (DHA), and/or many other hydrophobic drug molecules.

In some embodiments, the amount of blank emulsion added to a beverage can be determined by the beverage's flavor stock-keeping unit (SKU). For example, if the beverage's SKU indicates a strong citrus flavor or a high amount of sugar, a higher amount of the *Quillaja* extract blank emulsion can be used. In contrast, if the flavor of the beverage is plain, then a low amount of *Quillaja* extract blank emulsion can be used.

The final product can be a cannabis-infused beverage in a packaging material. The packaging material can be any packaging material described in this application as well as any packaging material known in the art.

In some embodiments, different concentrations of the universal blank emulsion can be used to create samples for testing. The testing can determine how much blank emulsion to use. A control sample with no blank emulsion can be used in the testing for comparison purposes.

EXAMPLES

Example 1

For hydrophobicity studies, a Krüss contact angle machine was used. An aluminum can was cut in half, and the flattened liner side was used as the testing surface. The contact angle of water, coconut oil, coconut oil+THC at different ratios, and coconut oil+CBD at different ratios on the liner was measured. The results are shown in Table 2.

TABLE 2

| Liquid | Contact Angle on Liner |
|---|---|
| Water | 85° |
| Coconut oil | 15° |
| Coconut oil:THC at 1:1 | 25° |
| Coconut oil:THC at 2:1 | 23° |
| Coconut oil:THC at 3:1 | 21° |
| Coconut oil:CBD at 1:1 | 27° |
| Coconut oil:CBD at 2:1 | 25° |
| Coconut oil:CBD at 3:1 | 24° |

As illustrated in Table 2, water has very high contact angle with the liner material, which shows that the liner is very hydrophobic. Coconut oil's low contact angle with the liner material at 15° shows that the coconut oil and liner are both hydrophobic; thus, they have very high affinity to each other. When THC and CBD were added into the coconut oil at 1:1 to 1:3 ratios, the contact angle of the mixture oil increased to above 20°.

It is known in the art that THC and CBD are hydrophobic but less hydrophobic than coconut oil, so it would be understood that having THC and CBD in the coconut oil would slightly reduce the hydrophobicity. However, it was unexpected that the contact angle increased by over 10°. It was also unexpected to find that when coconut oil amount increased from 1:1 to 3:1, the mixture oil's contact angles remain above 20°. This surprising discovery sets the foundation of this invention, where only a sufficient hydrophobicity difference allows the blank emulsion to stick to can liners at a higher affinity compared to an active emulsion using a wide range of carrier oil to cannabinoid ratios.

Thus, if a beverage comprises both the blank emulsion (made with coconut oil) and active emulsion (made with coconut+THC or CBD), the blank emulsion has a higher affinity to liner than the active emulsion. Thus, the blank emulsion prevents the active emulsion from sticking to the liner.

Example 2

A polysorbate-based CBD active emulsion (Emulsion 1) and a polysorbate-based blank emulsion (Emulsion 2) were produced. The only difference is that Emulsion 1 has CBD and carrier oil in the droplet and Emulsion 2 has only carrier oil in the droplet. The two emulsions were added into a BPA-non-intent can liner made with acrylic polymer. The active emulsion was added at 20 mg/12 oz, and the blank emulsion was added from 2% of the amount of active emulsion to up to 200% of the amount of active emulsion.

TABLE 3

| Emulsion | Ingredient weight (g) | | | |
|---|---|---|---|---|
| | CBD | MCT Oil | Polysorbate 20 | Water |
| 1 | 1 | 5 | 5 | 30 |
| 2 | 0 | 6 | 5 | 30 |

The table below shows that when there is only the active emulsion, CBD potency decreased by −49.8% and −70.9% at 20 weeks and 40 weeks, respectively. A rinse-recovery study was also done: at both testing points, after pouring out all liquid from the container, 200 mL of acetonitrile was added into the container. The container was sealed again and put onto a shaker to shake for 24 hours. Then the acetonitrile solution was tested for CBD concentration by high-performance liquid chromatography (HPLC) and total absorbed mg of CBD onto the liner was calculated. At 20 weeks and 40 weeks when CBD potency lost 49.8% and 70.9%, which accounts for 9.96 mg and 14.18 mg CBD loss from the liquid. The rinse-recovery results showed that 8.97 mg and 12.45 mg of CBD was found in the acetonitrile solution, which accounts for most of the lost cannabinoids in the liquid. This evidence shows that an emulsion droplet can physically stick to liner and cause potency loss.

However, when the blank emulsion was added, even at only 2% the amount of active emulsion, the potency loss started to decrease.

There was a clear trend that with more blank emulsion added, there was less potency loss, especially when the amount of blank emulsion reached 10% the amount of active emulsion: the potency loss reduced to a reasonable level where the overall potency loss should be within 10-15% from the starting point. Since certain blank emulsions can add additional bitter or oily flavor into the beverage, flavor impact needs to be considered.

TABLE 4

| Emulsion Combination/Types | 15-week potency loss | 30-week potency loss |
|---|---|---|
| Emulsion 1 | 49% | 70% |
| Emulsion 1 + Emulsion 2 at 2% amount of Emulsion 1 | 49% | 70% |
| Emulsion 1 + Emulsion 2 at 5% amount of Emulsion 1 | 37% | 44% |
| Emulsion 1 + Emulsion 2 at 10% amount of Emulsion 1 | 30.4% | 39% |
| Emulsion 1 + Emulsion 2 at 20% amount of Emulsion 1 | 24% | 28% |
| Emulsion 1 + Emulsion 2 at 40% amount of Emulsion 1 | 20% | 25% |
| Emulsion 1 + Emulsion 2 at 60% amount of Emulsion 1 | 18% | 24% |
| Emulsion 1 + Emulsion 2 at 80% amount of Emulsion 1 | 17% | 21% |
| Emulsion 1 + Emulsion 2 at 100% amount of Emulsion 1 | 15% | 19% |
| Emulsion 1 + Emulsion 2 at 150% amount of Emulsion 1 | 13% | 17% |
| Emulsion 1 + Emulsion 2 at 200% amount of Emulsion 1 | 9% | 14% |

Example 3

The pH will affect the zeta potential of the emulsion droplet. The zeta potential trend based on pH and different emulsion types is shown in FIG. 1. The trend shows that all emulsion types have negative zeta potential and that when pH was reduced from neutral to acidic, the zeta potential value decreased.

Figure 2:
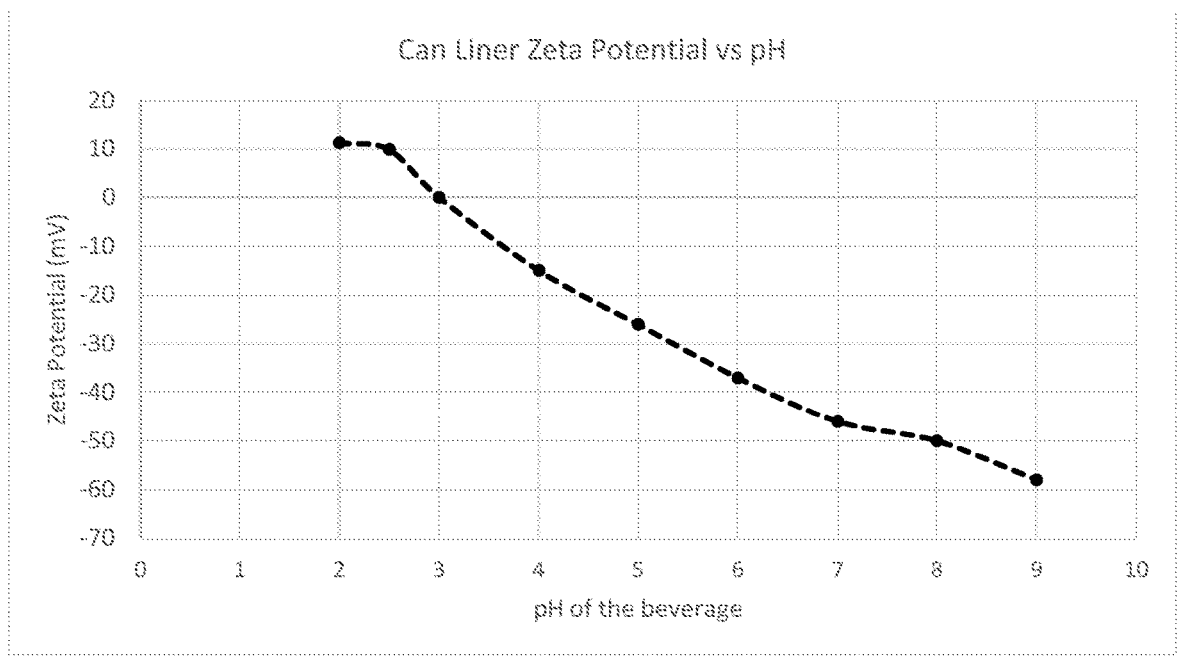
FIG. 2 shows results of experiments related to can liner potential under different pH conditions.

Can liner zeta potential under different pH was tested: the zeta potential of the liner polymer stayed negative above pH 3.0 and became positive below pH 3.0 (FIG. 2).

Taken together, the data above suggest that both the emulsion and the can liner can be negatively charged at a pH of above 3.0, and therefore can repel each other. At a pH of below 3.0, the emulsion can stay negatively charged and the can liner can stay positively charged and therefore be attracted to each other. The attraction of the emulsion to the can liner can result in a loss of potency of a beverage containing the emulsion.

Experiments were conducted to test the effect of different pH levels on potency loss. The Emulsions of Table 5 were prepared and tested. The results are shown in Table 6 below. Surprisingly, the expected effect of pH on potency loss was not observed.

TABLE 5

|  | Ingredient weight (g) | | | | |
| Emulsion | CBD | MCT oil | Polyglycerol | Q-Naturale | Water |
| --- | --- | --- | --- | --- | --- |
| 3 | 1 | 5 | 5 | 0 | 30 |
| 4 | 1 | 5 | 0 | 5 | 30 |

TABLE 6

|  | 15-week potency loss | | | | |
| Emulsion | pH 2.5 | pH 3.2 | pH 4.0 | pH 5.0 | pH 6.0 |
| --- | --- | --- | --- | --- | --- |
| 3 | 16% | 18% | 12% | 21% | 18% |
| 4 | 26% | 29% | 36% | 28% | 30% |

Example 4

Experiments were done to compare the affinity of different emulsions to packaging material.

Different types of CBD emulsions were produced and then given the same ingredient ratio (Table 7) and same processing condition before being infused into BPA-NI can liners at the same time and at the same level. To prevent chemical potency loss from oxidation, oxygen was removed from the packaging and 600 ppm EDTA as antioxidant was added.

Table 8 shows that when Q-Naturale was used as the main emulsifier, it had the most potency decay from physical absorption, suggesting that a Q-Naturale emulsion has the most affinity to the liner type. The effect of the emulsifier on affinity is hard to predict. For example, Q-Naturale emulsion's zeta potential (−34) and droplet size (200 nm) and are both within the middle of the range of all other emulsion types but demonstrate the highest affinity.

TABLE 7

|  | Ingredient weight (g) | | |
| CBD | MCT oil | Main Emulsifier | Water |
| --- | --- | --- | --- |
| 1 | 5 | 5 | 30 |

TABLE 8

| Emulsion | Main Emulsifier | Droplet Size | Zeta Potential | 5-week potency loss | 15-week potency loss | 30-week potency loss |
| --- | --- | --- | --- | --- | --- | --- |
| 1 | Polysorbate | 60 nm | −12 | 24% | 50% | 61% |
| 2 | Polyglycerol (10-2-P) | 120 nm | −16 | 8% | 12% | 14% |
| 3 | Gum Acacia | 500 nm | −10 | 9% | 12% | 16% |
| 4 | Q-Naturale | 200 nm | −34 | 25% | 56% | 63% |
| 5 | Vitamin E TPGS | 100 nm | −26 | 17% | 19% | 22% |
| 6 | Lecithin | 350 nm | −38 | 13% | 16% | 24% |
| 7 | Sucrose Ester | 180 nm | −37 | 10% | 14% | 21% |

Example 5

An example of the Q-Naturale blank emulsion was produced based on the recipe below.

TABLE 9

|  | Q-Naturale Blank Emulsion Ingredient Weight (g) | | | | | | |
| MCT oil | Q-Naturale | Sodium Benzoate | Potassium Sorbate | Citric Acid | Water | Total | MCT Potency (mg/g) |
| --- | --- | --- | --- | --- | --- | --- | --- |
| 1-5 | 0.7-3.5 | 0.01-0.05 | 0.01-0.05 | 0.1-0.5 | 8.18-40.90 | 10-50 | 100 |

The polysorbate CBD Emulsion 1 from Example 4 was used as the active emulsion. Experiments were done to determine how the amount of Q-Naturale emulsion would affect the potency stability in an aluminum can with BPA non-intent liner. Different amounts of the Q-Naturale blank emulsion was added into each 12 oz container.

The results demonstrated that adding Q-Naturale MCT emulsion, even at 5 mg/12 oz level, helped reduce the potency loss by 10-20%. It was also demonstrated that as the amount of MCT increased per unit, the potency loss decreased. However, at around 60 mg/12 oz, the potency loss reached a plateau, where adding further MCT did not reduce potency loss.

TABLE 10

| Emulsion Combination/Types | 15-week potency loss | 30-week potency loss |
|---|---|---|
| Polysorbate Emulsion | 49% | 70% |
| Polysorbate Emulsion + blank emulsion at 5 mg MCT/12 oz | 37% | 47% |
| Polysorbate Emulsion + blank emulsion at 20 mg MCT/12 oz | 25% | 38% |
| Polysorbate Emulsion + blank emulsion at 40 mg MCT/12 oz | 15% | 21% |
| Polysorbate Emulsion + blank emulsion at 60 mg MCT/12 oz | 9% | 14% |
| Polysorbate Emulsion + blank emulsion at 80 mg MCT/12 oz | 8% | 9% |
| Polysorbate Emulsion + blank emulsion at 100 mg MCT/12 oz | 9% | 10% |

Example 6

A universal blank emulsion including 60 mg MCT/12 oz was produced and further tested with different packaging types and different active emulsion types. The blank emulsion was tested in glass, different types of aluminum can liners, and various types of plastic bottles, including PET, PP, and HDPE containers. Results show that the blank emulsion reduced potency in different packaging types with different active emulsions.

It is noted that the method worked independent of the active emulsion type used. It worked with polysorbate active emulsion, polyglycerol active emulsion, gum acacia active emulsion, and with a *Quillaja* extract active emulsion.

When Q-Naturale emulsion is applied with different types of emulsions, there can be physical compatibility issues. Since emulsifiers can have affinity to each other, different droplets can merge overtime, which will diminish the blank emulsion's physical protection. The invention relates to this multi-compatibility feature and the surprising finding that the use of two emulsions (active and blank) does not result in the merging of one emulsion over time.

It is noted that the blank emulsion did not reduce potency loss in glass containers. This is likely because glass is hydrophilic so there is little loss of potency to begin with.

TABLE 11

| 30-week potency loss percentage CBD as active | | | | | | | | |
|---|---|---|---|---|---|---|---|---|
| Container Types | A. | B. | C. | D. | E. | F. | G. | H. |
| Polyglycerol Emulsion | 4% | 14% | 7% | 22% | 6% | 7% | 9% | 7% |
| Polyglycerol Emulsion + Q-Naturale Blank Emulsion at 60 mg/12 oz level | 4% | 4% | 4% | 10% | 3% | 4% | 4% | 3% |
| Gum Acacia Emulsion | 3% | 16% | 12% | 28% | 9% | 8% | 7% | 8% |
| Polyglycerol Emulsion + Q-Naturale Blank Emulsion at 60 mg/12 oz level | 3% | 7% | 7% | 11% | 4% | 4% | 3% | 4% |
| Q-Naturale Emulsion | 5% | 43% | 17% | 26% | 14% | 8% | 7% | 7% |
| Q-Naturale Emulsion + Q-Naturale Blank Emulsion at 60 mg/12 oz level | 4% | 20% | 7% | 11% | 6% | 3% | 3% | 3% |

A. Glass
B. MCC BPANI Liner
C. BPA Liner
D. Can Pak Acrylic Liner
E. Ball Gen 2 Liner
F. PET bottle
G. Polypropyl bottle
H. HDPE bottle Example 7

Experiments were done to determine the influence of the universal blank emulsion on taste and texture when added to a beverage. Even if an emulsifier has a neutral taste, the carrier oil type could add an oily flavor and/or texture.

In this example, the blank emulsion is referred to as "Boost" and it was produced at a carrier oil potency of 100 mg/g. Different levels of Boost were added into the beverages from 0.2 mL, 0.4 mL, to 0.6 mL per unit of 12 oz. The 3 samples were then tasted and compared with the original control sample. The taste-tester confirmed that at 0.4 mL level, the flavor did not have significant change compared to the control. Thus, it was determined to use the blank emulsion at this level if based on taste alone. However, potency loss can also be a factor in determining a concentration of blank emulsion to use.

TABLE 12

| Product Label | Description | Brix | pH | TA | Tasting Comments |
|---|---|---|---|---|---|
| SAMPLE A | Original (Control with N1 emulsion) | 1.88 | 3.215 | 0.1422% | Fruity, pineapple, slightly creamy<br>Citrusy tropical<br>Bright fruity citrus<br>Tropical, balanced, green profile, slight build up to astringent/bitter |
| SAMPLE B | N1 Emulsion + 0.2 Boost | 1.83 | 3.209 | 0.1395% | Very close to original<br>Similar to original, slight papery note, closest to original |

TABLE 12-continued

| Product Label | Description | Brix | pH | TA | Tasting Comments |
|---|---|---|---|---|---|
| | | | | | Slightly more blend, not as bright citrus, mild bitter finish |
| | | | | | Lower impact, lower body, acid peak more upfront, more citrus, not as much CBD lingering |
| | | | | | Not a big difference between this and original |
| | | | | | Slightly weaker flavor impact |
| SAMPLE C | N1 Emulsion + 0.4 Boost | 1.85 | 3.192 | 0.1439% | Very close to original but slightly less pineapple |
| | | | | | Less citrus impact, still pretty similar |
| | | | | | Slightly more bland, still good juiciness |
| | | | | | Rounded, slightly less tropical, clean citrus/fleshy |
| | | | | | Not a big difference between this and original |
| | | | | | Sweetness and flavor level seem the same as the original |
| SAMPLE D | N1 Emulsion + 0.6 Boost | 1.87 | 3.233 | 0.1444% | Slightly less pineapple, fruity profile not as distinct |
| | | | | | Much less tropical, more candy |
| | | | | | Less acidic citrus flavor impact, more bland, slight better finish |
| | | | | | CBD profile overwhelms the tropical/citrus notes, astringent bitter finish |
| | | | | | Lower fruity citrus impact than original |
| | | | | | Flavor impact weaker than in control |

Example 8

Experiments were done to determine ways to prevent oxidation in a cannabis beverage to ensure stable potency over shelf life. Three approaches were considered:

1) Removal of oxygen from the beverage at the co-packing level. This can involve de-aerating the water and other ingredients and purging the pipes between the mixing tank and the filler heads with an inert gas like $CO_2$ before filling. This can also involve purging the container and nitrogen flushing the top of the container. These steps can be necessary to reduce the dissolved oxygen down to 50-100 ppb level. At low dissolved oxygen level, cannabinoids can take a longer time to be oxidized thus have longer shelf life.

2) Use of packaging material that has a low oxygen ingress rate. For example, aluminum cans generally offer an enclosed system where oxygen is less likely to ingress. Glass bottles have a higher oxygen barrier but certain caps on the glass bottle may leak air, especially child resistant caps that may be required for the cannabis product. Plastic containers, including but not limited to, PET, PP, and HDPE, usually have an undesirable amount of oxygen ingress through the body and cap. Special additives in the polymer resin can be used to scavenge oxygen and prevent the oxygen ingress.

3) Use of antioxidants. This option was selected and further studied as described below.

In general, a cannabis beverage can oxidize and cannabinoid potency can decrease if the starting dissolved oxygen level is high, or the packaging material allows oxygen ingress overtime. Also, different cannabinoids have various oxidation rates depending on their chemical structure. For example, Delta-9 THC is most likely to be oxidized, Delta-8 THC has slight slower oxidation rate, CBD has even slower oxidation rate, and CBN is the final oxidized product of Delta-9 THC, making it very stable against oxidation.

To maintain the potency of a cannabis beverage, the initial dissolved oxygen can be reduced and packaging material that does not allow oxygen ingress over time can be used. However, these options may not be possible. For example, not all co-packing manufacturers have the capability to reduce the dissolved oxygen and certain cannabis beverages can require child resistant caps, which can create a challenge to stopping oxygen ingress. Thus, adding one or more antioxidants instead can mitigate potency loss.

Below is a table demonstrating potency loss of three types of THC nanoemulsions diluted into purified water and kept at 40° C. for 2 weeks and 4 weeks. The study was done without removing oxygen in the packaging, so the dissolved oxygen level was very high (around 5000 ppm). The THC potency loss reached over 90% at 4 weeks at 40° C. and it was independent of emulsion type.

Based on a typical accelerated shelf-life equation, 1 day at 40° C. usually equals 3.5 days at room temperature (23° C.). So, 4 weeks at 40° C. would roughly equal 14 weeks at room temperature, which is not very long considering the logistics involved from the time of production until the cannabis beverage is consumed by the consumer.

TABLE 13

| Emulsion | THC loss at 2 weeks | THC loss at 4 weeks |
| --- | --- | --- |
| Polysorbate Emulsion | 49% | 89% |
| Polyglycerol Emulsion | 42% | 91% |
| Q-Naturale Emulsion | 46% | 90% |

There are two major types of antioxidants depending on their solubility: oil-phased antioxidants and water-phased antioxidants. The oil-phased antioxidants usually exist within the emulsion droplet and water-phased antioxidants are usually added during beverage production. It was believed that both types of antioxidants should work since they follow similar mechanisms: both function as a sacrificial agent to be oxidized prior to oxidation of the API, or they function as chelating agents where they scavenge the metal ions that catalyze oxidation. However, it was discovered that when used individually, water-phased antioxidants worked much better than oil-based antioxidants in terms of delaying oxidation of cannabinoids in a beverage. An emulsion was produced using polysorbate, shown as Emulsion 1 in Table 3. The antioxidant concentration was targeted at 0.01%. The solution was stored in a glass bottle with a crown cap at 40° C. and the percent THC potency loss was monitored at 4 weeks and 10 weeks. The table below shows that water-based antioxidants performed much better than oil-based antioxidant counterparts. This could be due to the unique oxidation pathway of a cannabis emulsion.

TABLE 14

| Antioxidant category | Antioxidant type | THC loss at 4 weeks | THC loss at 10 weeks |
| --- | --- | --- | --- |
| Oil-soluble antioxidant | Vitamin E (tocopherol) | 25% | 46% |
| | Rosemary oil extract | 34% | 59% |
| Water-soluble antioxidant | Vitamin C (ascorbic acid) | 8% | 17% |
| | Rosemary extract in glycerol | 12% | 24% |

Based on the findings above, an in-depth investigation on the performance of water-soluble antioxidants was conducted. The study was done with standard protocol: 20 mg THC nanoemulsion was diluted in 12 oz purified water into an amber glass bottle which was finished with a crown cap. The nanoemulsion was produced using polysorbate as an emulsifier with 50 nm droplet size (See Emulsion 1 from Table 3). The pH of the solution was adjusted to 4.0. The water-soluble antioxidants were added into the final solution at 0.005% (50 ppm). The solution was kept at 40° C. and two data points were tested at 4 weeks and 10 weeks to monitor THC potency decay. Since the water base still contains transition metal ions such as $Fe^{2+}$, $Cu^{2+}$, and $Ca^{2+}$, and there is no procedure to remove oxygen from the water or the packaging, the samples were kept at an elevated temperature of 40° C. to allow oxidation to push potency decay. The table below shows the general results. Even though the antioxidants work using similar mechanisms, surprisingly, only EDTA and ascorbic acid showed results with less than 20% potency loss at 10 weeks.

TABLE 15

| Antioxidant types | THC loss at 4 weeks | THC loss at 10 weeks |
| --- | --- | --- |
| Ascorbic Acid | 8% | 10% |
| Gallic acid | 10% | 27% |
| Citric acid | 17% | 39% |
| Oxalic acid | 12% | 27% |
| Brew shield | 16% | 29% |
| Structuan | 14% | 31% |
| EDTA | 4% | 7% |
| Rosemary extract in glycerol (Herbalox ® (41.19.32) provided by Kalsec) | 12% | 24% |

EDTA and ascorbic acid were selected and ideal concentrations were determined. Since there is no upper limit when ascorbic acid is applied in a beverage, a wide range from 10 ppm to 2000 ppm was tested. Surprisingly, 50 ppm seems to be the threshold performance level for ascorbic acid where the potency loss dropped sharply to <10% at 10 weeks at 40° C. It was also found that continued increase of ascorbic acid concentration does not improve potency loss: a plateau is reached at 200 ppm.

TABLE 16

| Ascorbic acid concentration | THC loss at 10 weeks |
| --- | --- |
| 0.001% (10 ppm) | 36% |
| 0.002% (20 ppm) | 25% |
| 0.003% (30 ppm) | 14% |
| 0.005% (50 ppm) | 10% |
| 0.01% (100 ppm) | 7% |
| 0.02% (200 ppm) | 4% |
| 0.03% (300 ppm) | 4% |
| 0.05% (500 ppm) | 3% |
| 0.1% (1000 ppm) | 3% |
| 0.2% (2000 ppm) | 3% |

In the United States, the upper limit of applying EDTA is 33 ppm. Therefore, an EDTA range from 5-100 ppm was tested against THC potency loss. The table below shows that when EDTA concentration was above 10 ppm, the potency loss was below 10% at 10 weeks at 40° C. When EDTA concentration increased above 10 ppm, the potency loss remained at a steady plateau.

TABLE 17

| EDTA concentration | THC loss at 10 weeks |
| --- | --- |
| 0.0005% (5 ppm) | 21% |
| 0.001% (10 ppm) | 10% |
| 0.002% (20 ppm) | 8% |
| 0.0033% (33 ppm) | 8% |
| 0.005% (50 ppm) | 7% |
| 0.01% (100 ppm) | 7% |

All the testing above was based on the THC nanoemulsion made with polysorbate as an emulsifier (see Emulsion 1 from Table 3). Two other THC emulsions were produced with polyglycerol and Q-Naturale (see Emulsion 3 and 4 from Table 5). The 50 ppm ascorbic acid and 10 ppm EDTA were tested for all three emulsion types. The results below showed that the antioxidant property remained the same to various emulsion types. The emulsifier type or droplet size did not seem to affect antioxidant performance.

TABLE 18

| | 10-week THC potency loss | |
|---|---|---|
| Emulsion Type | With 50 ppm Ascorbic Acid | With 10 ppm EDTA |
| Emulsion 1 (Polysorbate) | 10% | 9% |
| Emulsion 2 (Polyglycerol) | 7% | 8% |
| Emulsion 3 (Q-Naturale) | 8% | 8% |

A further study was performed to combine water-soluble antioxidants (ascorbic acid and EDTA) with oil-soluble antioxidants (Vitamin E, rosemary extract, and propyl gallate) to test if the combination of the two antioxidant types would deliver more benefit in terms of remaining potency. The ascorbic acid and EDTA concentrations were targeted at 50 ppm and 10 ppm, respectively. The three oil soluble antioxidants were all targeted at 0.01% (100 ppm). Since previous experiments demonstrated that the different emulsion types tended to have the same oxidation profiles, only one emulsion type (Polysorbate Emulsion 1 from Table 3) was used in the second round of experiments. The results below demonstrate the added oil-soluble antioxidants slightly improved the THC potency decay compared to only using water soluble antioxidants. But the level of improvement was somehow limited.

TABLE 19

| | | Water-Soluble Antioxidant | |
|---|---|---|---|
| THC potency loss at 10 weeks with combined antioxidants | | 50 ppm Ascorbic Acid | 10 ppm EDTA |
| Oil-Soluble Antioxidant at 100 ppm | Vitamin E | 6% | 7% |
| | Rosemary Oil Extract | 7% | 6% |
| | Propyl Gallate | 7% | 6% |

The method of applying blank emulsion and applying water-soluble antioxidants can be combined into one system to offer the maximum potency protection, especially when the final product would be in hydrophobic packaging (e.g., aluminum can, PET bottle, other plastic bottles, and/or the like). The blank emulsion method will protect emulsion droplets from physically attaching to the packaging, and the ascorbic acid or EDTA can protect the oxidation of the cannabinoids. The two methods consist of a holistic system and the added effect is maintaining cannabinoid potency to allow for longer shelf life.

An important feature of the cannabis beverage can be crafting experiences, where one or multiple cannabinoids, together with one or multiple terpenes, can be emulsified and combined to create a unique experience. The cannabinoids and terpenes can be combined and emulsified all together, or they can be emulsified separately and combined later. The interaction between different cannabinoids and terpenes can often create the "entourage effect", where the user experience can be dramatically impacted with different active combinations. For example, beta-caryophyllene can cause a "dumping effect," CBD can cause a more "settling effect", and myrcene can deliver an elevated experience compared to pure THC.

However, nearly all terpenes can be oxidized and some can oxidize faster than others. When terpenes are put into a ready-to-drink beverage, the chemical degradation that can be caused by oxidation needs to be considered. When the oxidation happens, it not only diminishes the designed effect of the product, but it also creates unknown by-products that can be potentially harmful to consume. Oxidation rate of α-pinene and limonene was compared with the addition of ascorbic acid and EDTA. Table 20 below shows that the ascorbic acid and EDTA offered much better protection to pinene, myrcene, linalool, and limonene against oxidation.

TABLE 20

| | 2-weeks potency loss at 40° C. | | |
|---|---|---|---|
| | No antioxidant | 50 ppm ascorbic acid | 10 ppm EDTA |
| α-pinene | 57% | 4% | 6% |
| myrcene | 38% | 3% | 6% |
| linalool | 46% | 6% | 9% |
| limonene | 68% | 7% | 8% |

Terpenes have one or more carbon-carbon double bonds in their molecular structures. Due to this, terpenes have a high oxidation activity towards oxidants. The ascorbic acid or EDTA can offer greater protection to all terpenes including, but not limited to, myrcene, limonene, linalool, beta-caryophyllene, alpha-pinene and beta-pinene, alpha-bisabolol, eucalyptol, trans-nerolidol, humulene, delta-3-Carene, camphene, borneol, terpineol, valencene, geraniol, eugenol, sabinene, phellandrene, borneol, isoborneol, phytol, menthol, geraniol, citronellol, ocimene, halomon, thymol, carvacrol, thujene, camphene, camphor, verbenone, botrydial, ngaione, cuparane, labdane, ferruginol, cafestol, and/or combinations thereof.

"Cannabis beverage" is a typical product category where emulsion can deliver a hydrophobic compound into an aqueous-based product. Other hydrophobic nutraceuticals that can also deliver benefit within an aqueous-based product such as, for example, beverages and cosmetics, can be employed. When those hydrophobic compounds are delivered using an emulsion system into a final RTD product, a similar potency loss issue can happen. Since those compounds are hydrophobic and therefore tend to attach to the packaging wall, the blank emulsion idea would protect any physical-potency loss. Also, most of the natural compounds can go through similar oxidation cycle, where the antioxidant method can protect any chemical-potency loss due to oxidation.

Two additional examples where the system utilizing both combined methods can maintain the potency of other active compounds are astaxanthin and omega 3. Both compounds are very hydrophobic and very prone to oxidation. They are usually delivered to consumers in a gel capsule to avoid oxidation and interaction with packaging materials. However, consuming astaxanthin and omega 3 by just gel capsule would have very low bioavailability. To increase bioavailability, those compounds can be encapsulated into an emulsion and then infused into a standard beverage. However, when this happens, physical attachment and chemical oxidation can diminish the potency of the compounds.

The combination method of applying blank Q-Naturale emulsion and 200 ppm ascorbic acid or 20 ppm EDTA when delivering those two compounds in an aluminum can was tested. The 10-week results at 40° C. shows both compounds lose <6% potency, while the control group without blank emulsion or antioxidant lost almost 80% potency.

Similar systems can work other natural compounds that are hydrophobic and prone to be oxidized. Non-limiting examples of these natural compounds can include Vitamin E Vitamin B12, Vitamin A, Vitamin D, Vitamin B, fish oil, MCT oil, coconut oil, palm oil, eicosapentaenoic acid (EPA), docosahexaenoic acid (DHA); and essential oils (e.g., lemon oil, orange oil, peppermint oil, ylang-ylang oil, lemongrass oil, tea tree oil, rosemary oil, Australian sandalwood oil, grapefruit oil, frankincense oil, cedarwood oil, patchouli oil, cinnamon bark oil, bergamot oil, chamomile oil, lemon-eucalyptus oil, ginger oil, key-lime oil, vanilla oil, clove oil, and/or the like).

Example 9

The oxygen ingress rate of packaging material can also play a big role in the stability of the cannabinoid/terpene infused beverages. Different packaging materials have different oxygen ingress rates. For example, a sealed aluminum can has the lowest oxygen ingress; a glass bottle may only have ingress from the encloser cap, a screw cap and a crown cap leak different amounts of oxygen over storage time; and a PET bottle may have ingress from the cap and plastic body. Different plastic additives can be leveraged to delay the oxygen ingress from the PET bottle's main body. Also, in the cannabis industry, most products are required to have child-resistant packaging. Three different types of child-resistant caps were acquired from different brands designed at different facilities to test their oxygen ingress rates. The results in the table below demonstrate that all three child-resistant caps have very high oxygen ingress rates. This indicates they do not prevent oxygen ingress and thus facilitate the oxidation over time. When the container is a HDPE bottle, the oxygen ingress can be even higher than PET.

TABLE 21

| Packaging Types | Oxygen Ingress at 6 Months (ppm) |
| --- | --- |
| Aluminum Can | 0.005-0.02 |
| Glass Bottle with Screw Cap | 0.2-0.5 |
| Glass Bottle with Crown Cap | 2-4 |
| Glass Bottle with Wooden Cork | 0.4-0.6 |
| Glass Bottle with Child-Resistant Cap Type 1 | 6-8 |
| Glass Bottle with Child-Resistant Cap Type 2 | 5-6 |
| Glass Bottle with Child-Resistant Cap type 3 | 6-8 |
| Regular PET Bottle with Screw Cap | 5-6 |
| PET with Oxygen Barrier with Screw Cap | 0.3-0.6 |
| HDPE Bottle with Screw Cap | 6-8 |

So, with certain packaging types that allow oxygen ingress, even if the dissolved oxygen can be reduced to a low-level during production, the oxidation reaction can still happen due to continuous oxygen ingress over shelf life. In this case, applying antioxidant can be a solution to maintain the final product's potency. Also, since the oxygen continues to ingress, the oxidation kinetic can be different from the single-source oxygen at the very beginning of packaging. Thus, the continuation of oxygen addition can consume the antioxidant over time and diminish the final product's potency.

The concentration of the antioxidant was studied to ensure the antioxidant will last long enough to protect against THC degradation. The glass bottle with a child-resistant cap was tested against no antioxidant, three concentration levels of ascorbic acid, and the concentration levels of EDTA at room temperature for 6 month and 12 months. The result below showed that THC lost 56% potency at 6 month and 78% potency at 12 months with no antioxidant in a glass bottle with child-resistant cap.

Surprisingly, this result indicates that nearly all child-resistant caps required in the cannabis industry cannot work for cannabis beverages due to high oxygen ingress rate. However, when ascorbic acid (>50 ppm) and EDTA (>10 ppm) was added into the beverage, the THC potency loss was further delayed below 15% over 12-month shelf life at room temperature. This result proved that ascorbic acid and EDTA can be applied to child-resistant packaging.

TABLE 22

| Glass bottle with child resistant cap type 1 | THC potency loss % | |
| --- | --- | --- |
| | 6 months at room temperature | 12 months at room temperature |
| No antioxidant | 56 | 78 |
| Ascorbic acid 20 ppm | 21 | 35 |
| Ascorbic acid 50 ppm | 7 | 10 |
| Ascorbic acid 200 ppm | 3 | 7 |
| EDTA 5 ppm | 16 | 39 |
| EDTA 10 ppm | 8 | 12 |
| EDTA 20 ppm | 6 | 9 |

The various methods and techniques described above provide a number of ways to carry out the application. Of course, it is to be understood that not necessarily all objectives or advantages described are achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by including one, another, or several other features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps, some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, any numbers expressing quantities of ingredients, properties such as molecular weight, reaction conditions, and so forth, used to describe and claim certain embodiments of the disclosure are to be understood as being modified in some instances by the term "about." Accordingly, in some embodiments, the numerical parameters set forth in the written description and any included claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are usually reported as precisely as practicable.

In some embodiments, the terms "a" and "an" and "the" and similar references used in the context of describing a particular embodiment of the application (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Variations on preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

The various methods and techniques described above provide a number of ways to carry out the application. Of course, it is to be understood that not necessarily all objectives or advantages described are achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by including one, another, or several other features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, any numbers expressing quantities of ingredients, properties such as molecular weight, reaction conditions, and so forth, used to describe and claim certain embodiments of the disclosure are to be understood as being modified in some instances by the term "about." Accordingly, in some embodiments, the numerical parameters set forth in the written description and any included claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are usually reported as precisely as practicable.

In some embodiments, the terms "a" and "an" and "the" and similar references used in the context of describing a particular embodiment of the application (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Variations on preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A system to preserve potency of a hydrophobic active agent, comprising:
  a first emulsion, comprising:
    water;
    a carrier oil;
    a surfactant; and
    a hydrophobic active ingredient; and
  a second emulsion, comprising:
    water;
    a carrier oil; and
    a surfactant; and
  wherein the second emulsion does not comprise the hydrophobic active ingredient of the first emulsion;
  wherein when the two emulsions are diluted in a hydrophobic container with a beverage comprising ascorbic acid or EDTA as an antioxidant:
  the two emulsions remain in a dispersed form and have a droplet size that remains unaffected;
  the beverage is capable of being stored at room temperature in the hydrophobic packaging for 10 weeks with less than 20% loss in potency; and
  the second emulsion sticks to the hydrophobic container at a higher affinity than the first emulsion, thereby preventing the first emulsion from sticking to the hydrophobic container and thereby decreasing potency loss caused by emulsion droplets of the first emulsion sticking to the hydrophobic container.

2. The system of claim 1, wherein the second emulsion composition comprises a *Quillaja* extract composition.

3. The system of claim 1, wherein the second emulsion composition comprises one or more preservatives, one or more pH modulators, or both.

4. The system of claim 1, wherein the carrier oil of the second emulsion composition and the carrier oil of the first emulsion composition are the same.

5. The system of claim 1, wherein the carrier oil of the second emulsion is sunflower oil, olive oil, coconut oil, MCT (medium chain triglyceride) oil, LCT (long chain triglyceride) oil, sesame oil, avocado oil, palm oil, soybean oil, corn oil, peanut oil, canola oil, grape seed oil, hazelnut oil, rice bran oil, linseed oil, safflower oil, passion fruit oil or combinations thereof.

6. The system of claim 1, wherein the surfactant of the second emulsion composition and the surfactant of the first emulsion composition are the same.

7. The system of claim 1, wherein the ascorbic acid, if used, is at least 50 ppm of the final product and the EDTA, if used, is at least 10 ppm of the final product.

8. The system of claim 1, wherein the ascorbic acid or ETDA is capable of being applied together with an oil-soluble antioxidant.

9. The system of claim 8, wherein the oil-soluble antioxidant is propyl gallate, rosemary extract or Vitamin E.

10. The system of claim 1, wherein the system is capable of reducing the first emulsion from attaching to the packaging and reducing chemical potency decay caused by oxidation.

11. A method to preserve potency in a beverage using the system of claim 1, comprising combining the second emulsion and the first emulsion in the packaging.

12. The method of claim 11, where the hydrophobic compound is selected from Tetrahydrocannabinolic acid A (THCA-A), Tetrahydrocannabinolic acid B (THCAB), Tetrahydrocannabinol (THC), Tetrahydrocannabinolic acid C (THCA-C), Tetrahydrocannabinol C (THC-C), Tetrahydrocannabivarinic acid (THCV A), Tetrahydrocannabivarin (THCV), Tetrahydrocannabiorcolic acid (THCA-C), Tetrahydrocannabiorcol (THC-C), Delta-7-cis-iso-tetrahydrocannabivarin, Delta-8-tetrahydrocannabinolic acid (Δ8-THCA), Delta-9-tetrahydrocannabinol (Δ9-THC), Cannabidiolic Acid (CBDA), Cannabidiol (CBD), Cannabidiol monomethylether (CBDM), Cannabidiol-C(CBD-C), Cannabidivarinic Acid (CBDV A), Cannabidivarin (CBDV), Cannabidiorcol (CBD-C), Cannabigerolic acid (CBGA), Cannabigerolic Acid monomethylether (CBGAM), Cannabigerol (CBG), Cannabigerol monomethylether (CBGM), Cannabigerovarinic Acid (CBGV A), Cannabigerovarin (CBGV), Cannabichromenic Acid (CBCA), Cannabichromene (CBC), Cannabichromevarinic Acid (CBCV A), Cannabichromevaiin (CBCV), Cannabicyclolic acid (CBLA), Cannabicyclol (CBL), Cannabicyclovarin (CBL V), Cannabielsoic acid A (CBEA-A), Cannabielsoic acid B (CBEA-B), Cannabielsoin (CBE), Cannabinolic acid (CENA), Cannabinol (CBN), Cannabinol methylether (CBNM), CannabinolC4 (CBN-C4), Cannabivarin (CBV), Cannabinol-C(CBN-C), Cannabiorcol (CBN-C1), Cannabinodiol (CBND), Cannabinodivarin (CBVD), Cannabitriol (CBT), 10-Ethoxy-9-hydroxydelta-6a-tetrahydrocannabinol, 8,9-dihydroxy-delta-6a-tetrahydrocannabinol (8,9-Di-OH-CB TC5), Cannabitriolvarin (CBTV), Ethoxy-cannabitriolvarin (CBTVE), Dehydrocannabifuran (DCBF), Cannabifuran (CBF), Cannabichromanon (CBCN), Cannabicitran (CBT), 10-oxodelta-6a-tetrahydrocannabinol (OTHC), Delta-9-cis-tetrahydrocannabinol (Δ9-cisTHC), Cannabiripsol (CBR), -3, 4, 5,6-tetrahydro-7-hydroxy-alpha-alpha-2-trimethyl-9-n-propyl-2,6-methano-2H-lbenzoxocin-5-methanol (OH-iso-HHCV), Trihydroxydelta-9-tetrahydrocannabinol (tri OH-THC), Isocanabinoids, Epigallocatechin gallate, or combinations thereof.

13. The method of claim 11, where the hydrophobic compound is selected from myrcene, limonene, linalool, beta-caryophyllene, alpha-pinene and beta-pinene, alpha-bisabolol, eucalyptol, trans-nerolidol, humulene, delta-3-carene, camphene, borneol, terpineol, valencene, geraniol, eugenol, sabinene, phellandrene, borneol, isobomeol, phytol, menthol, geraniol, citronellol, ocimene, halomon, thymol, carvacrol, thujene, camphene, camphor, verbenone, botrydial, ngaione, cuparane, labdane, ferruginol, cafestol, or combinations thereof.

14. The method of claim 11, where the hydrophobic compound is selected from Vitamin E; Vitamin B 12; Vitamin A; Vitamin D; Vitamin B; Omega 3; astaxanthin; fish oil; MCT oil; coconut oil; palm oil; eicosapentaenoic acid (EPA); docosahexaenoic acid (DHA); essential oils such as but not limited to lemon oil, orange oil, peppermint oil, Ylang-Ylang oil, lemongrass oil, tea tree oil, rosemary oil, Australian sandalwood oil, grapefruit oil, frankincense oil, cedarwood oil, patchouli oil, cinnamon bark oil, bergamot oil, chamomile oil, lemon-eucalyptus oil, ginger oil, key lime oil, vanilla oil, clove oil; or combinations thereof.

15. An edible product in a hydrophobic container, comprising:
  i. a system to preserve potency of a hydrophobic active agent, comprising:
  a first emulsion, comprising: water; a carrier oil; a surfactant; and a hydrophobic active ingredient; and a second emulsion, comprising: water; a carrier oil; and a surfactant; wherein the second emulsion does not comprise the hydrophobic active ingredient of the first emulsion; and ii. ascorbic acid or EDTA as an antioxidant;

wherein the two emulsions remain in a dispersed form and have a droplet size that remains unaffected;

wherein the second emulsion sticks to the hydrophobic container at a higher affinity than the first emulsion, thereby preventing the first emulsion from sticking to the hydrophobic container and thereby decreasing potency loss caused by emulsion droplets of the first emulsion sticking to the hydrophobic container; and wherein the type of edible product, consists of: a beverage, comprising ascorbic acid or EDTA as an antioxidant; or a nutritional compound, comprising: at least one selected from the group consisting of: vitamin E, vitamin B12, vitamin A, vitamin D, vitamin B, fish oil, MCT oil, coconut oil, palm oil, eicosapentaenoic acid (EPA), docosahexaenoic acid (DHA); or essential oils, including: lemon oil, orange oil, peppermint oil, ylang-ylang oil, lemongrass oil, tea tree oil, rosemary oil, Australian sandalwood oil, grapefruit oil, frankincense oil, cedarwood oil, patchouli oil, cinnamon bark oil, bergamot oil, chamomile oil, lemon-eucalyptus oil, ginger oil, key-lime oil, vanilla oil, and/or clove oil; and wherein the edible product is capable of being stored at room temperature in the hydrophobic packaging for 10 weeks with less than 20% loss in potency.

16. A method of preparing an edible product in a hydrophobic container, comprising:

a system to preserve potency of a hydrophobic active agent, comprising:

a first emulsion, comprising: water; a carrier oil; a surfactant; and a hydrophobic active ingredient; and a second emulsion, comprising: water; a carrier oil; and a surfactant; wherein the second emulsion does not comprise the hydrophobic active ingredient of the first emulsion;

mixing the first emulsion;

mixing the second emulsion; wherein the second emulsion does not comprise the hydrophobic active ingredient of the first emulsion; and diluting the two emulsions in the edible product in the hydrophobic container;

wherein the two emulsions remain in a dispersed form and have a droplet size that remains unaffected;

wherein the edible product in the hydrophobic container, comprises: ascorbic acid or EDTA as an antioxidant;

wherein the second emulsion sticks to the hydrophobic container at a higher affinity than the first emulsion, thereby preventing the first emulsion from sticking to the hydrophobic container and thereby decreasing potency loss caused by emulsion droplets of the first emulsion sticking to the hydrophobic container, wherein the type of edible product, consists of: a beverage; or a nutritional compound, comprising: at least one selected from the group consisting of: vitamin E, vitamin B12, vitamin A, vitamin D, vitamin B, fish oil, MCT oil, coconut oil, palm oil, eicosapentaenoic acid (EPA), docosahexaenoic acid (DHA); or essential oils, including: lemon oil, orange oil, peppermint oil, ylang-ylang oil, lemongrass oil, tea tree oil, rosemary oil, Australian sandalwood oil, grapefruit oil, frankincense oil, cedarwood oil, patchouli oil, cinnamon bark oil, bergamot oil, chamomile oil, lemon-eucalyptus oil, ginger oil, key-lime oil, vanilla oil, and/or clove oil; and wherein the edible product is capable of being stored at room temperature in the hydrophobic packaging for 10 weeks with less than 20% loss in potency.

* * * * *